United States Patent [19]

Hansen

[11] Patent Number: 5,039,245
[45] Date of Patent: Aug. 13, 1991

[54] ASSEMBLY FOR CLAMPING ROTARY CUTTING TOOL TO SHAFT

[75] Inventor: Stephen F. Hansen, Lawrenceville, Ga.

[73] Assignee: North American Products Corp., Jasper, Ind.

[21] Appl. No.: 489,245

[22] Filed: Mar. 5, 1990

[51] Int. Cl.⁵ .............................................. F16B 2/14
[52] U.S. Cl. ................................... 403/370; 403/371
[58] Field of Search ............... 403/370, 369, 371, 367, 403/16, 355, 319

[56] References Cited

U.S. PATENT DOCUMENTS

| Re. 25,318 | 1/1963 | Benjamin et al. | |
|---|---|---|---|
| 2,381,697 | 8/1945 | Shepard | 403/16 |
| 2,470,179 | 5/1949 | McCloskey | 403/370 |
| 2,475,042 | 7/1949 | McCloskey | 403/370 X |
| 2,657,933 | 11/1953 | Stuebner | |
| 2,695,787 | 11/1954 | Sunnen | |
| 4,202,644 | 5/1980 | Soussloff | |
| 4,304,502 | 12/1981 | Stratienko | 403/370 |
| 4,600,334 | 7/1986 | Soussloff | 403/369 |
| 4,615,640 | 10/1986 | Hosokawa | 403/370 X |

FOREIGN PATENT DOCUMENTS 317469 7/1929 United Kingdom ................ 403/367

Primary Examiner—Peter M. Cuomo
Attorney, Agent, or Firm—Nilles & Nilles

[57] ABSTRACT

In the clamping assembly of this invention, whereby a rotary cutting tool is concentrically clamped to an untapered shaft that carries and drives it, a sleeve-like radially elastic collet, received in a bore through a hub-like tool body part, has a threaded end portion which projects axially beyond the bore and on which a nut is rotatable. The collet has an untapered radially inner surface and a tapered radially outer surface that progressively increases in diameter from the thread to its opposite end. The bore, all along its length, defines a matingly tapering inner wedging surface in the body part. The collet is confined to axial shifting relative to the body part. The nut is confined to rotation by a radially outwardly projecting circumferential flange on it, overlain by an annular captivating plate secured to the body part. Turning the nut in one direction shifts the collet axially in the direction to cause the tapering surfaces to contract the collet for radial clamping to the shaft and wedgingly lock it to the body part; opposite rotation of the nut compels opposite axial shifting of the collet for positive release of the assembly from the shaft.

8 Claims, 2 Drawing Sheets

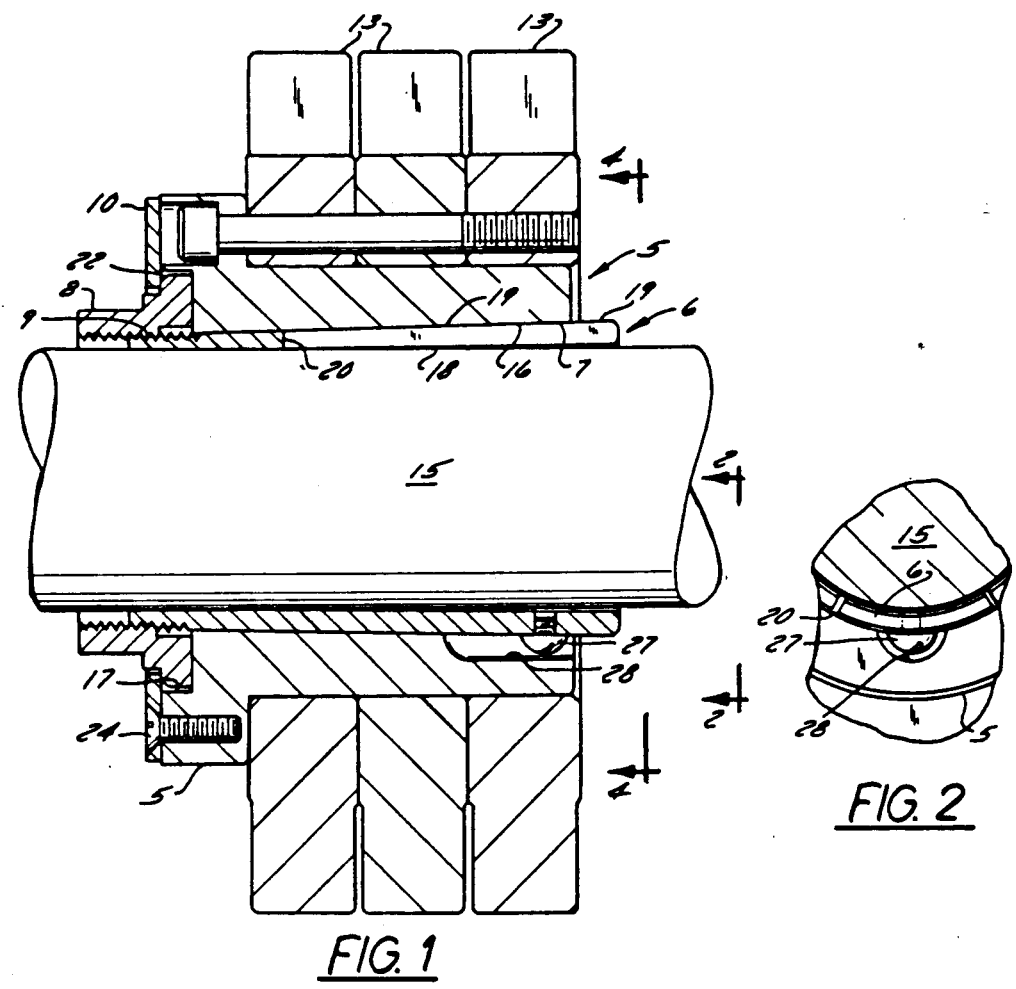
FIG. 1
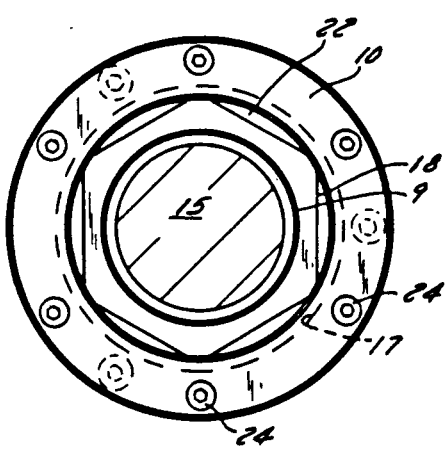
FIG. 2
FIG. 3
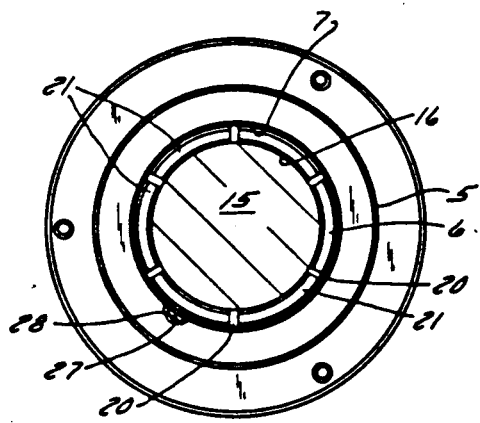
FIG. 4

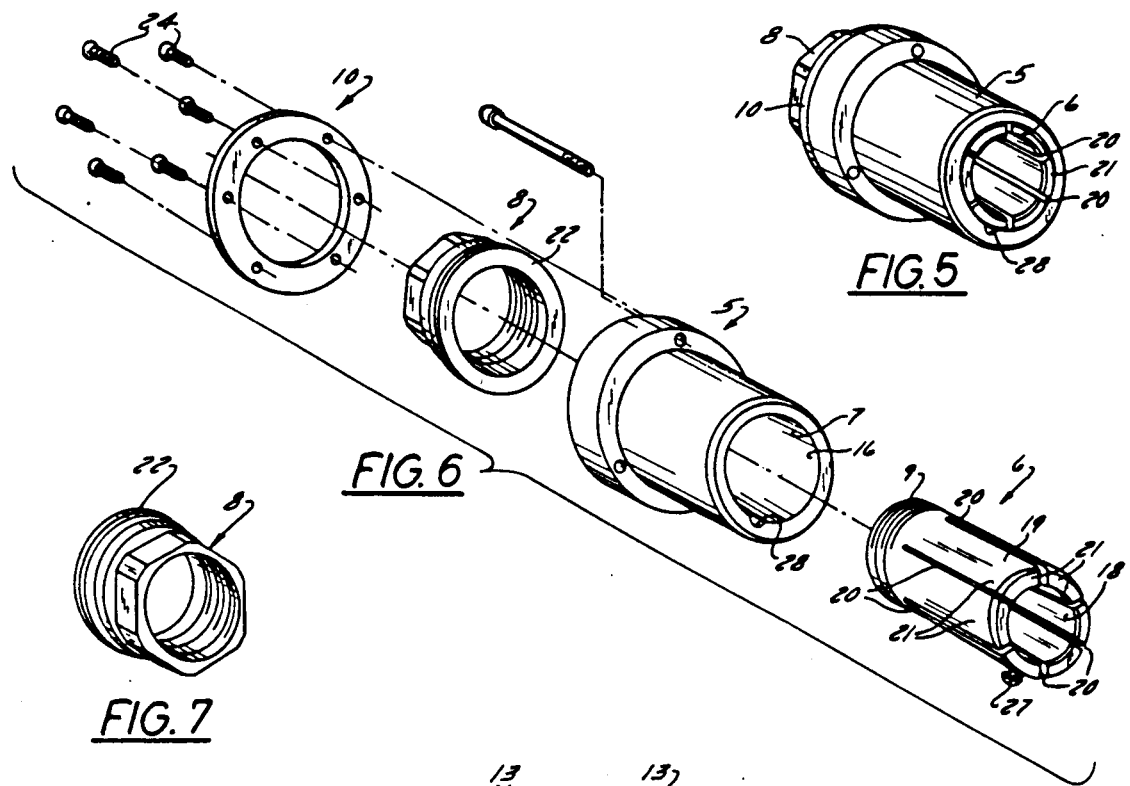
FIG. 5
FIG. 6
FIG. 7
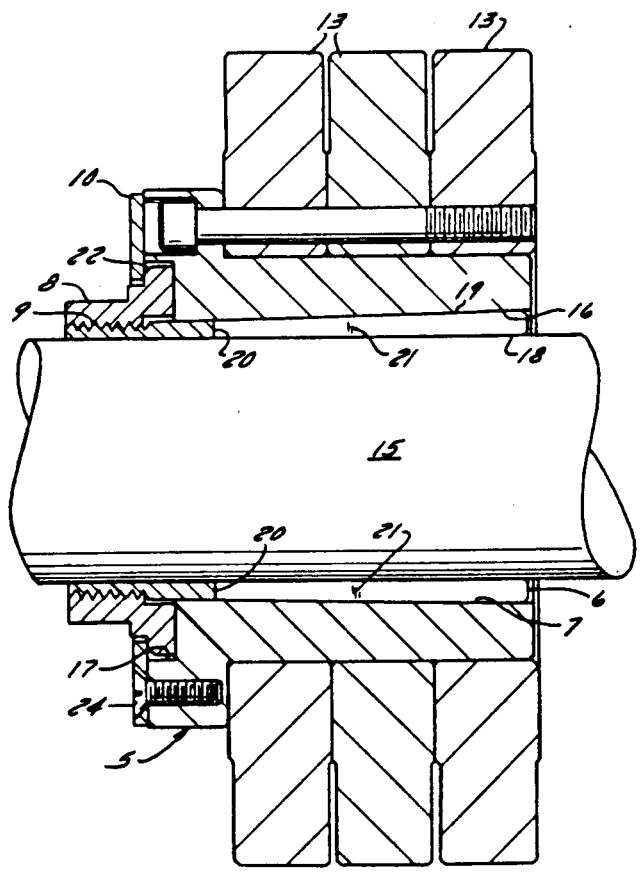
FIG. 8

ASSEMBLY FOR CLAMPING ROTARY CUTTING TOOL TO SHAFT

FIELD OF THE INVENTION

This invention relates to a radial clamping assembly that comprises a collet, whereby a hub-like tool body part for a rotary cutting tool can be releasably locked in concentric driving relationship to an untapered rotatable shaft; and the invention is more particularly concerned with a radial clamping assembly of that type which is capable of being both locked to a shaft and completely released therefrom by mere rotation of a nut relative to the tool body part, and which can at all times remain assembled as a self-contained unit that has all of its parts securely connected with one another.

BACKGROUND OF THE INVENTION

A radial clamping assembly of the general type to which this invention relates comprises a hub-like tool body part that carries the cutting elements of a rotary cutting tool. The tool body part may thus comprise a hub to which a circular saw blade is securely (but usually detachably) connected, or it may comprise the body of a milling cutter or the like to which carbide tips or similar cutting elements are secured. In any case, the cutting elements of the tool are arranged in concentric relation to an axis of the tool body part, and a bore through that part that is concentric to its axis receives an untapered shaft or arbor that normally carries the tool and rotatably drives it. In the bore, which has a substantially larger diameter than the untapered shaft, there is a sleeve-like collet which normally surrounds the shaft and which provides for wedge-locking radial clamping of the tool body part to the shaft.

In a heretofore conventional radial clamping assembly, the bore through the tool body part, which had a uniform diameter along its length, terminated at each of its ends at a concentric axially and radially outwardly flared conical enlargement or countersink in the tool body part. To provide for elastic radial dilation and contraction of the collet, the collet had long, axially extending slits through it, spaced at uniform intervals around its circumference and alternately opening to one and to the other of its ends. The inside diameter of the collet, which was uniform along substantially its entire length, was large enough for the collet, in relaxed condition, to fit loosely but closely on the shaft.

Along most of the length of the collet its radially outer surface was untapered, but at one of its end portions that surface had a rather abrupt axially outward flare, thus defining a conical wedging head on the collet that was matingly received in one of the countersinks in the tool body part. At its opposite end portion, which normally projected axially beyond the tool body part, the collet had an external thread upon which a large nut was seated. In the countersink adjacent to this threaded end portion of the collet, confined between the nut and the conical countersink surface, was a split, radially elastic collar that surrounded the collet and had a conical radially outer surface. Cooperating key and keyway means on the collet and the tool body part prevented rotation of the collet relative to the body part, confining the collet to axial motion in the body part. Thus, when the nut on the threaded end portion of the collet was rotated in a tightening direction, it reacted against the split collar, shifting the collet in the axial direction to draw the conical collet head into its adjacent countersink while driving the collar into the other countersink. In this manner the countersinks effected radial contraction of the two ends of the collet whereby it was clamped to an arbor or driving shaft at the same time that it was wedgingly locked to the body part.

For removing the assembly from the shaft, as when the cutting elements of the tool needed sharpening, the nut was rotated in the opposite or loosening direction. But it often happened that the assembly was not in fact released by loosening of the nut, or even by its complete removal from the collet, because the split collar and the wedging head on the collet were tightly wedged into their respective countersinks and could be freed only with a certain amount of improvisational tapping and prying. After being released, and with the nut removed from the threaded end portion of the collet, the nut, the collet and the split collar were free to fall away from one another and the body part and could thus become lost.

The radial clamping assembly just described had been in use for many years, and the inconveniences that it presented were clearly apparent to all who came into contact with it. It is evident that those skilled in the art could find no obvious way to overcome its deficiencies.

The most nearly pertinent prior art known to the applicant is U.S. Pat. No. 4,202,644 to Soussloff (1980), U.S. Pat. No. Re. 25,318 (orig. No. 2,465,837 of 1949) to Benjamin et al, U.S. Pat. No. 2,695,787 to Sunnen (1954) and U.S. Pat. No. 2,657,933 to Stuebner (1953). While these references may be found to convey suggestions for one or another of the individual features of the present invention—which suggestions are mostly apparent to hindsight—they do not individually or in combination address the problems solved by the present invention nor suggest the combination of features by which this invention is characterized.

SUMMARY OF THE INVENTION

The general object of the present invention is to provide a substantially improved radial clamping assembly of the above described character which is more convenient to use than prior such devices in being capable of quick, easy and positive release from a shaft by mere rotation of a nut in a loosening direction; which is arranged to be at all times self-contained, with no loose parts; and which is nevertheless less expensive to manufacture than prior such assemblies.

A more specific object of the invention is to provide a simple and inexpensive radial clamping assembly that comprises a large nut, wherein rotation of that nut in a tightening direction effects secure concentric clamping of a tool body part to a rotatable shaft, and wherein mere rotation of the nut in the opposite direction effects positive and complete release of the tool body part from the shaft.

Another specific object of the invention is to provide a radial clamping assembly which is self-contained in that all of its parts normally remain securely connected with one another at all times and under all conditions, so that none of those parts can get lost.

Another specific object of this invention, and a very important one, is to provide a radial clamping assembly having a collet which is more easily manufactured and less expensive than the collets of prior comparable assemblies but which nevertheless provides more locating surface than the collets of such prior assemblies and thus assures more stable and accurate concentricity between the tool body and a driving shaft to which it is clamped.

It is also an important specific object of this invention to provide a clamping assembly of the character described whereby a rotary tool is concentrically and releasably clamped to a shaft that carries the tool for its normal operation, such assembly being so arranged that it remains attached to the tool when the tool is removed from said shaft and provides for mounting of the tool during sharpening of its cutting elements, thereby avoiding problems of run-out and cutter eccentricity that were frequently encountered with prior such assemblies.

A further specific object of this invention is to provide a radial clamping assembly of the character described which does not include the split collar heretofore conventional in such assemblies, or any equivalent of it, and which is therefore less expensive to manufacture but is nevertheless more satisfactory in use.

It is also a specific object of the invention to provide a radial clamping assembly whereby the body of a rotary cutting tool can be releasably secured to a shaft, which assembly is so formed and arranged that surfaces which are engaged to establish and maintain the tool body in concentric relation to the shaft and to provide for transmission of torque between the shaft and the tool body are of substantially larger area than the corresponding surfaces of comparable prior assemblies, thus assuring more accurate and stable mounting of the tool on the shaft and more reliable torque transmission.

These and other objects of the invention that will appear as the description proceeds are achieved in the improved radial clamping means of this invention, which is of the type that comprises a hub-like tool body part for a rotary cutting tool, adapted to be releasably locked to an untapered rotatable shaft to be carried and rotatably driven by that shaft with an axis of the body part coinciding with an axis of the shaft. In addition to the body part the clamping means comprises a sleeve-like collet and a nut. The collet has radially inner and radially outer surfaces that are concentric to a collet axis, is radially elastic for dilation and contraction, and is received in a bore in the body part that is concentric to said axis of the body part. Further, the collet is confined against rotation relative to the body part and has a threaded portion adjacent to one of its ends which projects out of said bore and with which the nut is threadedly engaged, so that turning the nut in one direction of its rotation relative to the body part shifts the collet in one axial direction relative to the body part for wedging radial contraction of the collet that clamps it to said shaft and wedgingly locks it to the body part. The radial clamping means of this invention is characterized by cooperating means on the body part and on the nut whereby the nut is confined to rotation relative to the body part so that turning the nut in the opposite direction of its rotation shifts the collet in the opposite axial direction relative to the body part, enabling the collet to dilate elastically and thus release its clamping engagement with said shaft.

It is also a characterizing feature of the radial clamping means of this invention that the radially outer surface of the collet tapers to have a diameter that changes progressively through substantially the entire distance between said threaded portion and the opposite end of the collet; and the body part has a matingly tapered radially inner surface defined by said bore therein and extending axially along substantially the entire length of that bore. Preferably the taper in said radially outer surface of the collet is in the direction from said opposite end to said one end, so that the outside diameter of the collet is smallest adjacent to the thread on it.

A further characterizing feature of a preferred embodiment of the invention is that said collet has circumferentially spaced axially extending slits therein to provide for elastic radial dilation and contraction of the collet, every one of which terminates in axially spaced relation to said one end of the collet and opens through its opposite end.

BRIEF DESCRIPTION OF THE DRAWINGS

In the accompanying drawings, which illustrate what is now regarded as a preferred embodiment of the invention:

FIG. 1 is a view in section of a rotary cutting tool embodying the radial clamping assembly of this invention, taken substantially on the plane of its axis and showing the assembly in loose condition on a shaft;

FIG. 2 is a fragmentary view in transverse section, taken on the plane of the line 2—2 in FIG. 1;

FIG. 3 is an end view of the assembly shown in FIG. 1, taken from the left side of that figure;

FIG. 4 is a view in transverse section taken on the plane of the line 4—4 in FIG. 1;

FIG. 5 is a perspective view of the assembly itself;

FIG. 6 is a disassembled perspective view of the assembly;

FIG. 7 is a perspective view of the nut, as seen from the end thereof that is opposite the one visible in FIG. 6; and FIG. 8 is a view generally similar to FIG. 1 but showing the assembly in radially clamped relation to the shaft.

DETAILED DESCRIPTION OF THE PREFERRED EMBODIMENT OF THE INVENTION

Referring now to the accompanying drawings, a radial clamping assembly embodying the principles of this invention comprises, in general, a tool body part designated by 5, a sleeve-like collet 6 that is received in a bore 7 in the body part 5, a large nut 8 that is rotatably seated on a threaded end portion 9 of the collet, and an annular plate 10 that is secured to the body part and cooperates with it to confine the nut 8 to rotation.

It will be understood that the tool body part 5 is a component of a rotary cutting tool and that it comprises suitable means for securing to it cutting elements 13 that are disposed in concentric relation to its axis. As here shown by way of illustration, the cutting elements 13 are those of a router or the like, but the body part 5 could obviously be suitably designed for cooperation with a circular saw blade or any of a number of other rotary cutters. By means of the clamping assembly that comprises the collet 6 and the nut 8, the body part 5 can be releasably but securely locked in concentric relation to an untapered rotatable shaft or arbor 15 that normally carries the tool and drives it for its rotation.

The bore 7 through the tool body part, wherein the collet 6 is received and which is of course concentric to the axis of the body part, tapers uniformly all along its length and thus defines a tapering radially inner wedging surface 16 in the body part. At one of its ends, preferably its small diameter end, the bore 7 opens into a shallow concentric counterbore 17 in the body part.

The sleeve-like collet 6 has a radially inner surface 18 that is of uniform diameter all along its length, but its concentric radially outer surface 19 tapers along its length in mating correspondence to the taper of the wedging surface 16 in the body part. Preferably this taper on the collet is in the direction such that the outside diameter of the collet is smallest adjacent to the thread 9 thereon and largest at its end opposite the thread, and correspondingly the tubular wall of the collet increases in thickness from the thread to said opposite end.

To provide for its elastic radial contraction and dilation, the collet 6 has long, axially extending slits 20 through its wall that are spaced at regular circumferential intervals around it. In the collet of this invention every slit 20 opens through the thicker end of the collet wall and terminates at or near the threaded portion 9 of the collet, in axially inwardly spaced relation to the end of the collet adjacent to the thread. The collet thus comprises in effect a plurality of radially flexible fingers 21, each defined by a pair of circumferentially adjacent slits 20 and each being most readily flexible at its end adjacent to the thread on the collet, where it is thinnest.

The nut 8, which has an internal thread that mates with the thread 9 on the collet, has at its axially inner end a preferably integral, radially outwardly projecting circumferential flange 22. The outside diameter of this flange 22 is such that it is received with a close but freely rotatable fit in the counterbore 17 in the body part. Closely overlying the flange 22 on the nut is the annular plate 10, which is secured to the body part 5 by means of bolts 24 that extend axially inwardly through the plate and are threaded into the body part 5. The annular plate 10 cooperates with the axially outwardly facing end wall of the counterbore 17 to axially captivate the flange 22 and thus confine the nut 8 to rotation relative to the body part. As the description proceeds, it will be seen that there will rarely, if ever, be need to remove the annular plate 10 and thus free the nut 8 for disassembly from the collet and the body part; hence, for practical purposes, the bolts 24 can be regarded as permanently securing the plate 10 to the body part 5.

The main portion of the nut 8 projects axially outwardly through the central hole in the annular plate 10, to be accessible for manual rotation. This projecting portion of the nut has a radially outer surface of conventional polygonal cross-section, for engagement by a suitable wrench or spanner (not shown) by which the nut is rotated.

Whereas the nut 8 is confined to rotation relative to the body part 5, the collet 6 is confined to axial sliding relative to the body part. To this end the collet and the body part have cooperating key and keyway means. In this case the key comprises a short round-headed screw 27 that is threaded into the collet near its thicker end and has its relatively large head overlying the radially outer surface of the collet, while the keyway is defined by an axially extending groove 28 in the wedging surface 16 of the body part, which groove is of a size to receive the head of the screw 27 with a close, slidably guiding fit. To provide for assembly of the collet into the body part, the keyway groove 28 extends all the way to the large diameter end of the tapering bore 7 in the body part.

It will now be seen that rotation of the nut 8 in a tightening direction relative to the body part 5 (and thus also relative to the collet 6) effects axial shifting of the collet in the direction to draw its thicker end axially into the bore 7 in the body part. With this shifting of the collet, the internal wedging surface 16 on the body part, defined by the tapering body bore 7, cooperates with the matingly tapered radially outer surface 19 on the collet to radially contract the collet. Thus, if the nut 8 is rotated in this tightening direction at a time when the collet surrounds a shaft 15 with which it is intended to cooperate, the collet is contracted into radial clamping engagement with that shaft while at the same time being wedgingly locked to the body part. Because the matingly tapering surfaces 16, 19 of the collet and of the body part are wedgingly engaged along substantially their entire lengths, and each finger 21 of the collet is likewise engaged with the shaft 15 along substantially its entire length, the body part is very securely locked to the shaft in stable, accurately concentric relation to it.

To release the tool from the shaft 15, the nut 8 is simply rotated in its opposite or loosening direction. Because of the axial captivation of the nut 8, the collet 6 is constrained to move axially in the direction to relieve both its wedging engagement with the body part and its radial clamping engagement with the shaft 15. Thus, no more than rotation of the nut 8 in the loosening direction is needed for effecting complete and positive release of the tool body part 5 from the shaft 15.

Unless the annular plate 10 is deliberately removed from the tool body part 5, the assembly that comprises those components plus the collet 6 and the nut 8 will always constitute a self-contained unit wherein all parts are connected with one another so that none of them can get lost. Because the assembly does not come apart when it is removed from the shaft 15 that normally carries it, the entire assembly stays with the cutting elements 13 during resharpening, thus ensuring that the cutting elements 13 will be sharpened in true concentricity to the axis of the tool body part 5 and, correspondingly, will be accurately concentric to the shaft 15 on which the tool normally operates.

From the foregoing description taken with the accompanying drawings it will be apparent that this invention provides a simple and inexpensive assembly of the type comprising a collet whereby a body part for a rotary cutting tool is radially clamped to an untapered shaft that normally carries the tool and rotatably drives it, said assembly being securely lockable in concentric relation to the shaft by mere rotation of its nut in one direction, and being positively and completely releasable from the shaft by rotation of its nut in the opposite direction. It will also be apparent that the assembly of this invention has the further advantage that it remains assembled as a self-contained unit when removed from the shaft. It will be further apparent that the assembly of this invention, notwithstanding the novel conveniences it offers, is less expensive to manufacture than equivalent prior assemblies and ensures that the collet will have more secure, stable and accurate surface-to-surface engagement with the shaft and with the tool body part.

What is claimed is:

1. Radial clamping means whereby a hub-like tool body part for a rotary cutting tool can be releasably locked to an untapered shaft to be carried and rotatably driven by it, said radial clamping means being of the type comprising a sleeve-like collet which is received in a bore in said body part, is elastic for radial dilation and contraction, has an untapered radially inner surface for clamping engagement with said shaft, and has a tapering concentric external surface that mates with a tapering internal surface on the body part, and a nut on a threaded and portion of said collet that projects axially out of said bore, said nut, upon being turned in one direction of its rotation, being cooperable with the body part to shift the collet in one axial direction relative to the body part and thereby cause said tapering surfaces to contract the collet for clamping to said shaft while wedgingly locking the collet to the body part, said radial clamping means being characterized by:

A. said body part having a counterbore into which said bore opens concentrically at one of its ends;

B. a concentric, radially outwardly projecting circumferential flange on said nut that is rotatably received in said counterbore; and C. an annular plate secured to the body part in concentric relation to said counterbore and axially outwardly overlying said flange, said plate having a central aperture through which a portion of said nut projects axially outwardly to be accessible for rotation, and said plate cooperating with said flange to confine the nut to rotation relative to the body part.

2. The radial clamping means of claim 1, further characterized by:

A. said tapering external surface on the collet being of progressively increasing diameter from said threaded end portion of the collet to the opposite end thereof; and said tapering surface on the body part being defined by said bore therein and extending along substantially the entire length of that bore.

3. The radial clamping means of claim 1, further characterized by:

A. said untapered radially inner surface on the collet being of uniform diameter along substantially the entire length of the collet;

B. said tapering external surface on the collet being of progressively increasing diameter from said threaded end portion of the collet to the opposite end thereof, the wall of the collet thus being thickest at its said opposite end; and C. the collet having circumferentially spaced axially elongated slits therein, every one of which extends from near said threaded end portion of the collet through its said opposite end, and which provide for its elastic radial dilation and contraction.

4. Radial clamping means whereby a hub-like tool body part for a rotary cutting tool can be releasably locked to an untapered shaft to be carried and rotatably driven by it, said radial clamping means being of the type comprising a sleeve-like collet which is received in a bore in said body part, is elastic for radial dilation and contraction, and has a tapering concentric external surface that makes with a tapering internal surface on the body part, and a nut on a threaded end portion of said collet that projects axially out of said bore, said nut, upon being turned in one direction of its rotation, being cooperable with the body part to shift the collet in one axial direction relative to the body part and thereby cause said tapering surfaces to contract the collet for clamping to said shaft while wedgingly locking the collet to the body, part, said radial clamping means being characterized by:

A. said collet having an untapered radially inner surface for clamping engagement with said shaft;

B. said tapering external surface on the collet (1) extending axially substantially from the thread on said end portion of the collet to the opposite end of the collet and (2) being of progressively increasing diameter from said thread to said opposite end;

C. said collet having axially extending circumferentially spaced slits therethrough that provide for its elastic radial dilation and contraction, every such slit having one end axially inwardly adjacent to said threaded portion of the collet and extending through said opposite end thereof;

D. said tapering surface on the body being a radially inner surface thereof which is defined by said bore therein and which is of progressively increasing diameter through substantially the entire length of said bore;

E. said body part having therein a counterbore which is concentric to said bore and to which said bore opens at one of its ends;

F. concentric radially outwardly projecting circumferential flange on said nut which is rotatably received in said counterbore; and G. an annular captivating plate secured to the body part concentrically to said counterbore and axially outwardly overlying said flange to normally inseparably connect the nut with the body part while confining the nut to rotation relative to the body part.

5. The radial clamping means of claim 4, further characterized by:

H. means providing a radially inwardly projecting fixed protuberance on the body part that projects radially into said bore therein and is received in a closely fitting axially elongated slot in the collet to prevent relative rotation between the collet and the body part while permitting relative axial motion between them.

6. Radial clamping means whereby a hub-like tool body part for a rotary cutting tool, wherein there is a concentric bore that defines an axially tapering bore surface, can be releasably locked to an untapered shaft to be carried and rotatably driven by it, said radial clamping means being characterized by:

A. a sleeve-like collet receivable in said bore, said collet (1) having an untapered radially inner surface for clamping engagement with said shaft, (2) having at one end thereof a threaded portion that projects out of said bore, (3) having circumferentially spaced, axially elongated slits therein, each extending through the other end of the collet from a point axially inwardly adjacent to said threaded portion thereof, to provide for elastic radial dilation and contraction of the collet, and (4) having an axially tapering radially outer surface which is concentric to said radially inner surface and the taper of which mates with that of said bore surface in the body part;

B. a nut rotatable on said threaded end portion of the collet;

C. said body part having a counterbore into which said bore opens concentrically at one of its ends;

D. said nut having a radially outwardly projecting circumferential flange thereon that is concentrically received in said counterbore; and E. an annular captivating plate secured to the body part in concentric relation to said counterbore and axially outwardly overlying said flange, said plate having a central aperture through which a portion of said nut projects axially outwardly to be accessible for rotation whereby the nut is confined to rotation relative to the body part so that turning the nut in one direction of its rotation shifts the collet in one axial direction relative to the body part and thereby causes said tapering surfaces to radially contract the collet for clamping to said shaft, while rotation of the nut in the opposite direction relative to the body part shifts the collet in the opposite axial direction relative to the body part for allowing the collet to dilate out of clamped engagement with the shaft.

7. The radial clamping means of claim 6, further characterized by:

(1) said tapering radially outer surface on the collet being of progressively increasing diameter from said threaded portion of the collet to said other end thereof; and (2) said tapering bore surface on the body part extending along substantially the entire length of said bore in the body part.

8. The radial clamping means of claim 6, further characterized by:

D. means on said body part providing a radially inwardly projecting fixed protuberance that is received in a closely fitting, axially elongated slot in the collet to prevent rotation of the collet relative to the body part while permitting relative axial motion between them.

* * * * *